(No Model.)
J. J. ARMSTRONG & A. S. LOWREY.
CORN OR COTTON PLANTER.
No. 401,728. Patented Apr. 23, 1889.
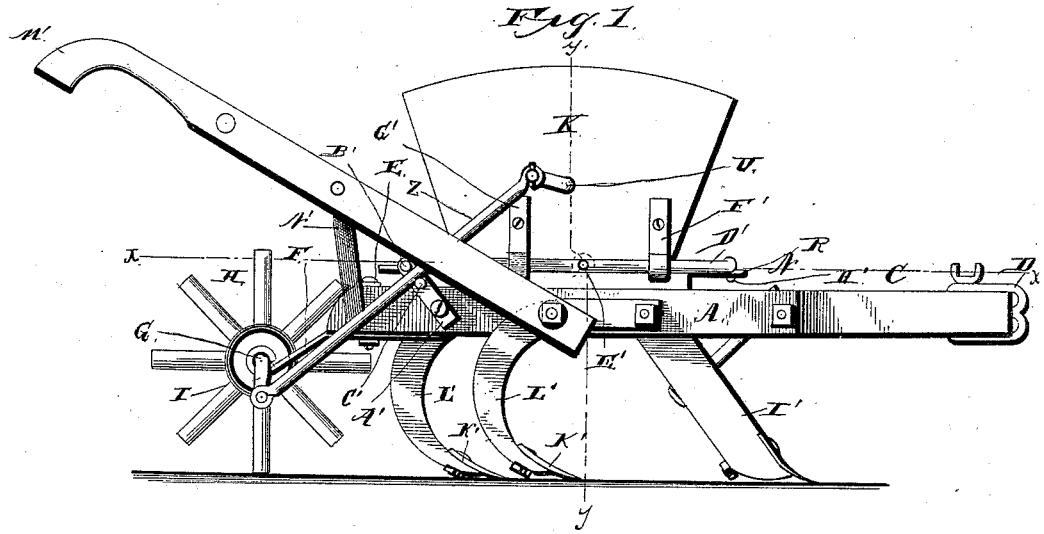
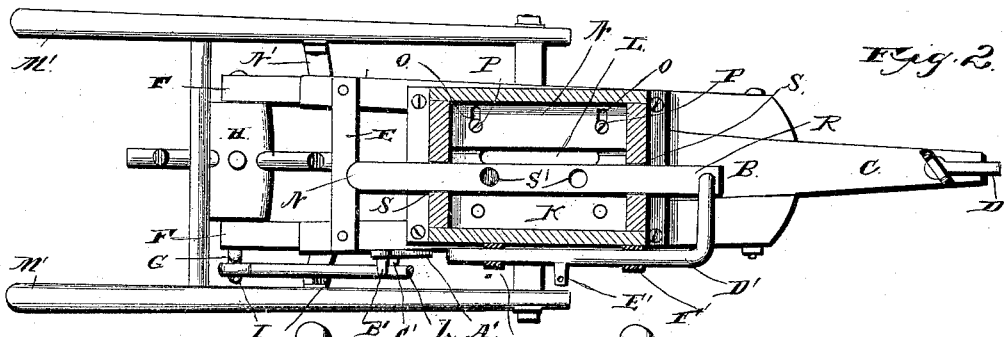
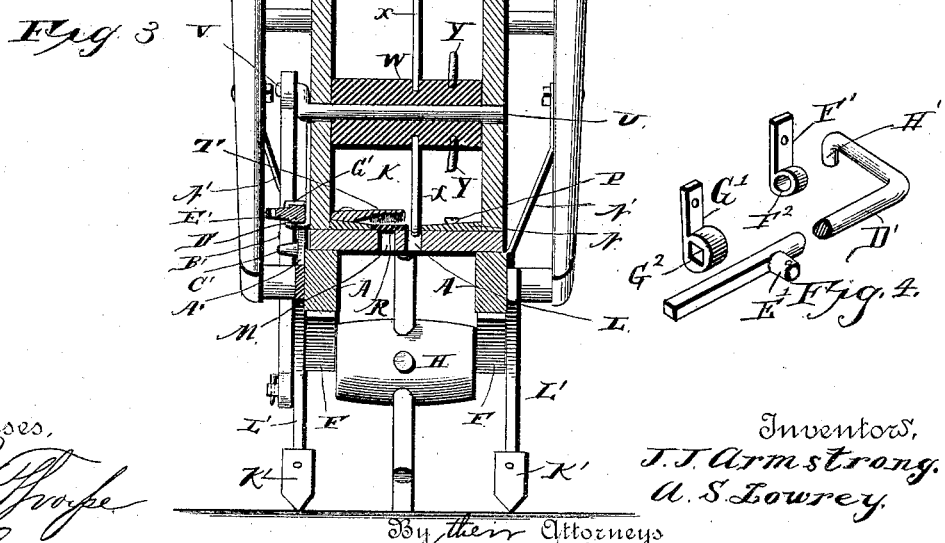
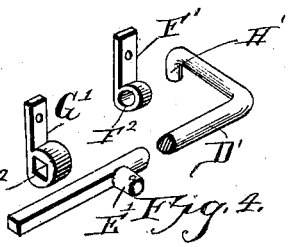
Witnesses,
Inventors,
J. J. Armstrong.
A. S. Lowrey.
By their Attorneys

UNITED STATES PATENT OFFICE.

JOHN JOSHUA ARMSTRONG AND ANDREW STEPHEN LOWREY, OF WEIMAR, TEXAS.

CORN OR COTTON PLANTER.

SPECIFICATION forming part of Letters Patent No. 401,728, dated April 23, 1889.

Application filed August 2, 1888. Serial No. 281,762. (No model.)

*To all whom it may concern:*

Be it known that we, JOHN JOSHUA ARMSTRONG and ANDREW STEPHEN LOWREY, citizens of the United States, residing at Weimar, in the county of Colorado and State of Texas, have invented a new and useful Improvement in Corn and Cotton Planters, of which the following is a specification.

Our invention relates to an improvement in corn and cotton planters; and it consists in the peculiar construction and combination of devices, that will be more fully set forth hereinafter, and particularly pointed out in the claims.

In the accompanying drawings, Figure 1 is a side elevation of a planter embodying our improvements, showing the same arranged for planting cotton. Fig. 2 is a horizontal sectional view taken on the line $x$ $x$ of Fig. 1. Fig. 3 is a vertical transverse sectional view taken on the line $y$ $y$ of Fig. 1. Fig. 4 is a detail perspective view of the yoke and the rectangular and cylindrical bearings therefor.

A represents a pair of forwardly-converging beams, between the front ends of which is bolted the block B, which has a forwardly-extending beam, C, provided at its front end with a clevis, D.

E represents a cross-bar, which connects the beams A near their rear ends. A pair of arms, F, extend downward and rearward from the rear ends of the beams A, and have bearings formed at their lower ends, in which is journaled a shaft, G. A walking-wheel, H, is secured to the said shaft, and to one end of the shaft is attached a crank, I, or the same may be formed by bending the shaft, if preferred.

K represents a hopper, which is secured on the beams A at a suitable distance from the front end thereof. The bottom of the hopper may be inclined in opposite directions toward the center, and is provided with a longitudinal discharge-opening, L. On one side of the said opening, in the center of the hopper, is a discharge-opening, M.

N represents an adjusting-plate, which is arranged on one of the sides of the bottom of the hopper, is provided with transverse slots O, and is secured at any desired adjustment by means of set-screws P, which work in the said slots and engage the bottom of the hopper. The function of this plate is to enable the opening L to be partly or entirely closed.

R represents a seed-slide, which is guided and reciprocates in openings S in the front and rear sides of the hopper, and extends longitudinally through the same. The said seed-slide is provided with openings S', which are adapted to register with the opening M.

T represents a brush, which is arranged transversely in the bottom of the hopper, at the center of the same, and bears upon the upper side of the seed-slide at a point above the opening N in the hopper.

Journaled transversely in the sides of the hopper, at the center of the same, is a shaft, U, which has a crank, V, at one end, and secured to the shaft is an agitator-cylinder, W, which is provided with a series of radial ejecting-arms, X, which are curved at their outer ends and are adapted to sweep successively through the opening L in the bottom of the hopper, and said agitator is further provided with stirring-arms Y, which prevent seeds from becoming lodged in the hopper.

Z represents a rod, which connects the cranks I and V. Secured on the outer side of one of the beams A, at a suitable distance from the rear end thereof, is an inclined arm, A', which is provided at its upper end with a pair of horizontally-extending studs, B' C', the latter being lower than the former and arranged at a suitable distance therefrom. Said stud and arm constitute a guide for the rod Z, the latter passing between the studs, and the same forming the fulcrum for the said rod, whereby the latter is caused to transmit the rotary motion of the crank I to the crank V, so as to cause the agitator W to rotate in the hopper when the machine is in motion.

D' represents an operating-yoke, which comprises a bar having its front ends bent at right angles. The front portion of the said bar is circular in cross-section, and the rear portion thereof is rectangular in cross-section, and from the center of the bar projects a stud, E'.

F' and G' represent a pair of straps or plates, which are attached to one side of the hopper, near the front and rear ends thereof, and are provided at their lower ends, respectively, with curved and rectangular guides F² and G², for the curved and rectangular portions of the yoke D'. The front end of the said yoke is turned down at right angles to form a pin, H', which engages an opening in the front end of the seed-slide.

From the foregoing description it will be understood that when the yoke is caused to reciprocate similar motion is imparted to the seed-slide. When the yoke is moved forward until its stud E' comes in contact with the bearing at the lower end of plate F', the rear end of the yoke clears the bearing G', so as to disengage the rectangular portion of the yoke, and the same may be then turned in the bearing F', so as to cause the pin H' to disengage the seed-slide and permit the latter to be removed and another having a larger or smaller opening to be substituted in its stead, so as to adapt the machine for planting different kinds of grain.

When the rod Z is connected to the crank V, so that the agitator W is rotated, the machine is adapted for use in planting cotton-seeds. In order to plant corn, peas, or similar seeds, the rod Z is disengaged from the crank V and is connected to the stud E', so as to cause the rotary motion of the walking-wheel to impart reciprocating motion to the yoke and to the seed-slide.

A furrow-opener, I', depends from the block B, and covering-shovels K' are secured to curved standards L', that are bolted to the beams A. M' represents handles, which are similar to plow-handles, have their front ends secured on the outer sides of the beams A by means of a bolt, and are supported at any desired inclination by means of inclined arms N', that project upward from the rear ends of the beams A.

We are aware that it has been heretofore proposed to provide a planter with a yoke connected to the seed-slide to reciprocate the latter, and to provide a driving-shaft having a crank and a pitman to connect the latter to the yoke, the said pitman being detachable therefrom at will; hence we make no claim, broadly, to such construction.

Having thus described our invention, we claim—

1. The combination, in a planter, of the hopper having the plates F' G' on one side at its front and rear ends, respectively, said plates being provided, respectively, with cylindrical and rectangular guides or bearings F² G², the seed-slide arranged in the hopper and extending longitudinally through openings in the front and rear sides thereof, the reciprocating yoke having its front portion circular in cross-section and its rear portion rectangular in cross-section, said front and rear portions being arranged, respectively, in the cylindrical and rectangular guides or bearings, and said yoke being further provided at its front ends with the arm to engage the seed-slide and provided at its center with the stud E', the driving-shaft having the crank, and the rod Z, connected to the crank and detachably connected to the stud E', substantially as described.

2. In a planter, the combination, with the hopper and the seed-slide therein having one end projecting from one end of the hopper, of the reciprocating yoke D', having its rear portion angular in cross-section and its front portion cylindrical in cross-section and having an arm at one end to engage the opening in the projecting end of the seed-slide, the angular and cylindrical bearings G' F', for the respective parts of the yoke, whereby the latter may be unshipped from or attached to the seed-slide, and the mechanism to reciprocate the yoke, substantially as described.

In testimony that we claim the foregoing as our own we have hereto affixed our signatures in presence of two witnesses.

JOHN JOSHUA ARMSTRONG.
ANDREW STEPHEN LOWREY.

Witnesses:
A. B. ROGERS,
W. J. THORNTON.